(12) United States Patent
Kim et al.

(10) Patent No.: US 9,093,702 B2
(45) Date of Patent: *Jul. 28, 2015

(54) ELECTROLYTIC SOLUTION FOR LITHIUM BATTERY, LITHIUM BATTERY EMPLOYING THE SAME AND METHOD FOR OPERATING THE LITHIUM BATTERY

(75) Inventors: Jin-Sung Kim, Suwon-si (KR); Mi-Hyeun Oh, Su-won-si (KR); Jin-Hyuk Lim, Su-won-si (KR); Su-Hee Han, Su-won-si (KR); Na-Rae Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 684 days.

This patent is subject to a terminal disclaimer.

(21) Appl. No.: 12/580,995

(22) Filed: Oct. 16, 2009

(65) Prior Publication Data
US 2011/0050178 A1 Mar. 3, 2011

Related U.S. Application Data

(60) Provisional application No. 61/239,696, filed on Sep. 3, 2009.

(51) Int. Cl.
| | |
|---|---|
| H01M 4/36 | (2006.01) |
| H01M 4/131 | (2010.01) |
| H01M 10/0567 | (2010.01) |
| H01M 4/505 | (2010.01) |
| H01M 4/525 | (2010.01) |
| H01M 10/0525 | (2010.01) |
| H01M 10/44 | (2006.01) |
| H01M 4/02 | (2006.01) |

(52) U.S. Cl.
CPC .............. *H01M 4/364* (2013.01); *H01M 4/131* (2013.01); *H01M 4/505* (2013.01); *H01M 4/525* (2013.01); *H01M 10/0525* (2013.01); *H01M 10/0567* (2013.01); *H01M 10/44* (2013.01); *H01M 2004/028* (2013.01); *H01M 2300/0025* (2013.01); *H01M 2300/0037* (2013.01); *Y02E 60/122* (2013.01)

(58) Field of Classification Search
CPC ..... H01M 4/364; H01M 4/131; H01M 4/505; H01M 4/525; H01M 10/0525; H01M 10/0567; H01M 10/44; H01M 2004/028; H01M 2300/0025; Y02E 60/122
USPC ........... 429/231.1, 231.3, 307, 339, 330, 199; 252/62.2
See application file for complete search history.

(56) References Cited

U.S. PATENT DOCUMENTS

| | | | |
|---|---|---|---|
| 4,964,878 A | 10/1990 | Morris | |
| 5,418,682 A | 5/1995 | Warren, Jr. et al. | |
| 5,589,295 A | 12/1996 | Derzon et al. | |
| 6,436,577 B1 * | 8/2002 | Kida et al. .................... 429/223 |
| 6,482,547 B1 | 11/2002 | Yoon et al. | |
| 6,506,524 B1 | 1/2003 | McMillan et al. | |
| 6,743,947 B1 | 6/2004 | Xu et al. | |
| 7,335,446 B2 | 2/2008 | Chiga et al. | |
| 7,521,151 B2 | 4/2009 | Hwang et al. | |
| 7,622,222 B2 | 11/2009 | Chiga et al. | |
| 7,691,537 B2 | 4/2010 | Kim | |
| 7,718,311 B2 | 5/2010 | Yamaguchi et al. | |
| 7,776,475 B2 | 8/2010 | Shimizu et al. | |
| 7,824,809 B2 | 11/2010 | Watanabe et al. | |
| 2004/0013946 A1 | 1/2004 | Abe et al. | |
| 2004/0151981 A1 | 8/2004 | Spahr et al. | |
| 2004/0197667 A1 | 10/2004 | Noh et al. | |
| 2004/0201366 A1 | 10/2004 | Kimoto et al. | |
| 2004/0214092 A1 | 10/2004 | Noh et al. | |
| 2005/0031963 A1 | 2/2005 | Im et al. | |
| 2005/0069767 A1 | 3/2005 | Tsunekawa et al. | |
| 2005/0069775 A1 | 3/2005 | Hwang et al. | |
| 2005/0208371 A1 | 9/2005 | Kim et al. | |
| 2005/0221168 A1 | 10/2005 | Dahn et al. | |
| 2006/0024584 A1 | 2/2006 | Kim et al. | |
| 2006/0035144 A1 | 2/2006 | Shimizu et al. | |
| 2006/0194118 A1 | 8/2006 | Yew et al. | |
| 2006/0204834 A1 | 9/2006 | Kim et al. | |
| 2006/0222937 A1 | 10/2006 | Morimoto et al. | |
| 2007/0009806 A1 | 1/2007 | Kim | |
| 2007/0231705 A1 | 10/2007 | Ohzuku et al. | |
| 2008/0057402 A1 | 3/2008 | Abe et al. | |
| 2008/0102369 A1 | 5/2008 | Sakata et al. | |
| 2008/0118846 A1 * | 5/2008 | Lee et al. ................... 429/341 |

(Continued)

FOREIGN PATENT DOCUMENTS

| | | |
|---|---|---|
| CN | 1237003 A | 12/1999 |
| CN | 1487621 A | 4/2004 |

(Continued)

OTHER PUBLICATIONS

European Search Report dated Mar. 31, 2010, for corresponding European Patent application 10250076.6.
Korean Office Action dated Aug. 29, 2011 issued in Korean Application No. 10-2009-0123992, 4 pages.
Machine English Translation of JP 2003-197190 A, 63 pages.
European Patent Office action dated Jul. 27, 2012 issued in parallel European application No. 10250076.6 (3 pages).
SIPO Office action dated Dec. 17, 2013, for corresponding Chinese Patent application 201010273555.5 (9 pages), and English Translation (9 pages).
English machine translation of Japanese Publication 2005-066407, 11 pages.
Patent Abstracts of Japan and English machine translation of Japanese Publication 2009-158464, (56 pages).
Derwent Abstract and English machine translation of International application WO 03/075371, (14 pages).

(Continued)

*Primary Examiner* — Laura Weiner
(74) *Attorney, Agent, or Firm* — Christie, Parker & Hale, LLP (57) ABSTRACT

In an embodiment of the invention, an electrolytic solution for a lithium battery including a cathode having a nickel (Ni)-cobalt (Co)-manganese (Mn)-based active material includes a nonaqueous organic solvent, a lithium salt, and adiponitrile. A lithium battery employs the electrolytic solution. A method of operating the battery includes charging the battery to a final charge voltage of about 4.25V or greater.

6 Claims, 4 Drawing Sheets

(56) References Cited

U.S. PATENT DOCUMENTS

| | | | |
|---|---|---|---|
| 2008/0118847 A1* | 5/2008 | Jung et al. | 429/342 |
| 2008/0152998 A1 | 6/2008 | Murakami et al. | |
| 2008/0220336 A1 | 9/2008 | Mun et al. | |
| 2008/0248396 A1 | 10/2008 | Jung et al. | |
| 2008/0248397 A1 | 10/2008 | Jung et al. | |
| 2009/0047582 A1 | 2/2009 | Kim et al. | |
| 2009/0142663 A1 | 6/2009 | Takeuchi et al. | |
| 2009/0181301 A1 | 7/2009 | Kim et al. | |
| 2009/0253045 A1 | 10/2009 | Kotato et al. | |
| 2010/0167131 A1 | 7/2010 | Kim et al. | |
| 2010/0233549 A1 | 9/2010 | Kim et al. | |

FOREIGN PATENT DOCUMENTS

| | | |
|---|---|---|
| CN | 1543006 A | 11/2004 |
| CN | 1612405 A | 5/2005 |
| CN | 1650466 A | 8/2005 |
| CN | 1242510 C | 2/2006 |
| CN | 1847155 A | 10/2006 |
| CN | 101170201 A | 4/2008 |
| EP | 1 150 374 A1 | 10/2001 |
| EP | 1 463 143 A2 | 9/2004 |
| EP | 1 508 934 A1 | 2/2005 |
| EP | 1 696 501 A1 | 8/2006 |
| EP | 1 742 281 A1 | 1/2007 |
| EP | 1 463 143 A3 | 4/2008 |
| EP | 2 108 640 A1 | 10/2009 |
| JP | 10-069915 | 3/1998 |
| JP | 10-247519 | 9/1998 |
| JP | 2003-173816 | 6/2003 |
| JP | 2003-197190 A | 7/2003 |
| JP | 2005-505904 | 2/2005 |
| JP | 2005/066407 | 3/2005 |
| JP | 2006-107815 | 4/2006 |
| JP | 2006-245001 | 9/2006 |
| JP | 2008-108586 | 5/2008 |
| JP | 2008-235008 | 10/2008 |
| JP | 2009-158464 | 7/2009 |
| JP | 2009-527088 | 7/2009 |
| KR | 10-2000-0073252 | 12/2000 |
| KR | 10-2000-0074691 | 12/2000 |
| KR | 10-2001-0098895 | 11/2001 |
| KR | 10-2001-0104150 | 11/2001 |
| KR | 10-2002-0029813 | 4/2002 |
| KR | 10-2003-0057321 | 7/2003 |
| KR | 10-2005-0075297 | 7/2005 |
| KR | 10-2005-0078443 | 8/2005 |
| KR | 10-2005-0089246 | 9/2005 |
| KR | 10-2005-0114698 | 12/2005 |
| KR | 10-2006-0035767 | 4/2006 |
| KR | 10-2006-0044919 | 5/2006 |
| KR | 10-2006-0060683 | 6/2006 |
| KR | 10-2006-0075966 | 7/2006 |
| KR | 10-2006-0114919 | 11/2006 |
| KR | 10-2007-0006253 | 1/2007 |
| KR | 10-2007-0075355 | 7/2007 |
| KR | 10-2007-0091938 | 9/2007 |
| KR | 10-0814827 B1 | 3/2008 |
| KR | 10-2008-0031151 | 4/2008 |
| KR | 2008-0037574 A | 4/2008 |
| KR | 2009-0063441 A | 6/2009 |
| TW | 200520276 | 6/2005 |
| WO | WO 97/35332 A1 | 9/1997 |
| WO | WO 98/15024 A1 | 4/1998 |
| WO | WO 03/032415 A2 | 4/2003 |
| WO | WO 03/075371 A2 | 9/2003 |
| WO | WO 2005/069423 A1 | 7/2005 |
| WO | WO 2007/081169 A1 | 7/2007 |
| WO | WO 2007/094625 A1 | 8/2007 |
| WO | WO 2007/094626 A1 | 8/2007 |
| WO | WO 2007/142121 A1 | 12/2007 |
| WO | WO 2008/093837 A1 | 8/2008 |

OTHER PUBLICATIONS

KIPO Office action dated Sep. 21, 2009, for Korean Patent application 10-2007-0130804, (7 pages).
KIPO Office action dated Jun. 25, 2010, for Korean Patent application 10-2008-0065442, (5 pages).
KIPO Office action dated Oct. 25, 2010, for Korean Patent application 10-2008-0065442, (5 pages).
SIPO Office action dated Apr. 21, 2011, for Chinese Patent application 200910140202, (21 pages).
SIPO Reexamination dated Feb. 5, 2013, for Chinese Patent application 200710181435.0, with English translation, (11 pages).
SIPO Reexamination Decision dated Apr. 11, 2013, with English translation, for Chinese Patent application 200710181435.0, (22 pages).
KIPO Office action dated Jun. 27, 2011, for Korean Patent application 10-2008-0065442, (5 pages).
Int'l Search Report dated Apr. 20, 2007, and Written Opinion for Int'l Patent application PCT/KR2007/000214, (6 pages).
JPO Office action dated Nov. 29, 2011, for Japanese Patent application 2008-292467, (3 pages).
U.S. Office action dated Jul. 12, 2011, for cross reference U.S. Appl. No. 11/876,999, 15 pages.
U.S. Office action dated Aug. 4, 2011, for cross reference U.S. Appl. No. 12/334,337, (14 pages).
U.S. Office action dated Nov. 1, 2011, for cross reference U.S. Appl. No. 11/876,999, (12 pages).
U.S. Office action dated Feb. 13, 2012, for cross reference U.S. Appl. No. 11/876,999, (10 pages).
U.S. Office action dated Nov. 19, 2010, for cross reference U.S. Appl. No. 11/808,732, (17 pages).
U.S. Office action dated Mar. 24, 2011, for cross reference U.S. Appl. No. 11/808,732, (19 pages).
U.S. Office action dated Aug. 8, 2011, for cross reference U.S. Appl. No. 11/808,732, (20 pages).
U.S. Office action dated Apr. 21, 2011, for cross reference U.S. Appl. No. 12/223,950, (9 pages).
U.S. Office action dated Oct. 19, 2011, for cross reference U.S. Appl. No. 12/087,813, (8 pages).
U.S. Office action dated Jan. 26, 2012, for cross reference U.S. Appl. No. 12/458,219, (17 pages).
SIPO Office action dated Sep. 2, 2014 with English translation, for corresponding Chinese Patent application 201010273555.5, (8 pages).

* cited by examiner

ELECTROLYTIC SOLUTION FOR LITHIUM BATTERY, LITHIUM BATTERY EMPLOYING THE SAME AND METHOD FOR OPERATING THE LITHIUM BATTERY

CROSS-REFERENCE TO RELATED APPLICATIONS

This application claims priority to and the benefit of Provisional Patent Application No. 61/239,696 filed in the U.S. Patent and Trademark Office on Sep. 3, 2009, the entire content of which is incorporated herein by reference.

BACKGROUND OF THE INVENTION

1. Field of the Invention

Embodiments of the present invention relate to an electrolytic solution for a lithium battery including a cathode including a nickel (Ni)-cobalt (Co)-manganese (Mn)-based active material, a lithium battery employing the electrolytic solution, and a method of operating the lithium battery.

2. Description of the Related Art

A lithium battery is a battery that converts chemical energy into electrical energy through an electrochemical redox reaction of chemical substances. The lithium battery includes a cathode, an anode, and an electrolytic solution.

Recently, as electronic devices increasingly demand high performance, batteries used therein must have high capacity and high power output. In order to manufacture a battery having high capacity, active materials are used that have high capacity or high battery charging voltage.

However, since a high battery charging voltage increases side reactions between electrodes and the electrolytic solution, lifetime and high-temperature stability characteristics of the battery may deteriorate.

SUMMARY OF THE INVENTION

One or more embodiments of the present invention include an electrolytic solution for a lithium battery including a cathode containing a Ni—Co—Mn-based active material. A lithium battery employing such an electrolytic solution has high capacity, long lifetime, and good high temperature stability.

One or more embodiments of the present invention include a lithium battery employing the electrolytic solution.

One or more embodiments of the present invention include a method of operating the lithium battery.

According to one or more embodiments of the present invention, an electrolytic solution for a lithium battery that includes a cathode containing a nickel (Ni)-cobalt (Co)-manganese (Mn)-based active material includes a nonaqueous organic solvent, a lithium salt, and adiponitrile. An amount of adiponitrile in the electrolytic solution may be equal to or less than 10 parts by weight based on 100 parts by weight of the total amount of the nonaqueous organic solvent and the lithium salt.

The Ni—Co—Mn-based active material may be represented by Formula 1 below:

$$Li_x(Ni_pCo_qMn_r)O_y \quad \text{Formula 1}$$

In Formula 1, $0.95 \leq x \leq 1.05$, $0 < p < 1$, $0 < q < 1$, $0 < r < 1$, $p+q+r=1$, and $0 < y \leq 2$.

The amount of adiponitrile may be about 0.1 parts by weight to about 10 parts by weight based on 100 parts by weight of the total amount of the nonaqueous organic solvent and the lithium salt.

The electrolytic solution may further include an additive having at least one carbonate-based material selected from vinylene carbonate (VC) and fluoroethylene carbonate (FEC).

According to one or more embodiments of the present invention, a lithium battery includes a cathode containing a nickel (Ni)-cobalt (Co)-manganese (Mn)-based active material, an anode including an anode active material, and an electrolytic solution. The electrolytic solution includes a nonaqueous organic solvent, a lithium salt, and adiponitrile. An amount of adiponitrile in the electrolytic solution is equal to or less than 10 parts by weight based on 100 parts by weight of the total weight of the nonaqueous organic solvent and the lithium salt.

According to one or more embodiments of the present invention, a method of operating a lithium battery includes providing a lithium battery and charging the lithium battery to a final charge voltage of equal to or greater than 4.25V. The lithium battery including a cathode containing a nickel (Ni)-cobalt (Co)-manganese (Mn)-based active material, an anode containing an anode active material, and an electrolytic solution. The electrolytic solution includes a nonaqueous organic solvent, a lithium salt, and adiponitrile. An amount of adiponitrile in the electrolytic solution is 10 parts by weight or less based on 100 parts by weight of the total amount of the nonaqueous organic solvent and the lithium salt.

BRIEF DESCRIPTION OF THE DRAWINGS

These and/or other aspects of the present invention will become more apparent and more readily appreciated from the following description of the embodiments, taken in conjunction with the accompanying drawings in which.

DETAILED DESCRIPTION OF THE INVENTION

Certain exemplary embodiments of the present invention will now be described with reference to the accompanying drawings, in which like reference numerals refer to like elements throughout. However, it is understood that the presently described embodiments may be modified in many different ways, and are therefore not to be construed as limiting the scope of the present invention.

According to some embodiments, an electrolytic solution for a lithium battery including a cathode containing a nickel (Ni)-cobalt (Co)-manganese (Mn)-based active material includes a nonaqueous organic solvent, a lithium salt, and adiponitrile ($NC(CH_2)_4CN$). The amount of adiponitrile in the electrolytic solution may be equal to or less than 10 parts by weight based on 100 parts by weight of the total amount of the nonaqueous organic solvent and the lithium salt.

The Ni—Co—Mn-based active material may be used for a lithium battery having high capacity, long lifetime, and good high temperature stability. For example, the Ni—Co—Mn-based active material may be represented by Formula 1 below:

$$Li_x(Ni_pCo_qMn_r)O_y \quad \text{Formula 1}$$

In Formula 1, x, p, q, r, and y refer to a molar ratio of the elements, and $0.95 \leq x \leq 1.05$, $0 < p < 1$, $0 < q < 1$, $0 < r < 1$, $p+q+r=1$, and $0 < y \leq 2$. For example, in some embodiments $0.97 \leq x \leq 1.03$, p may be 0.5, q may be 0.2, r may be 0.3, and y may be 2, but x, p, q, r and y are not limited thereto.

One nonlimiting example of a suitable Ni—Co—Mn-based active material is $LiNi_{0.5}Co_{0.2}Mn_{0.3}O_2$.

The adiponitrile in the electrolytic solution reduces deterioration of lifetime performance and high temperature stability of the lithium battery including the Ni—Co—Mn-based active material when the lithium battery is charged with a high voltage. The adiponitrile even improves lifetime performance and high-temperature stability of the lithium battery. Thus, the lithium battery may have high capacity, long lifetime, and good high temperature stability.

In order to achieve high capacity of the lithium battery including the Ni—Co—Mn-based active material, a large amount of Li ions may be used by charging the lithium battery with a high voltage of about 4.25 V or greater. In a high voltage charging system, reaction between the Ni—Co—Mn-based active material and the electrolytic solution increases, leading to deterioration in lifetime performance and high-temperature stability of the lithium battery. However, the reaction between adiponitrile and the surface of the Ni—Co—Mn-based active material stabilizes the structure of the cathode including the active material, and thus side reactions between the surface of the cathode and the electrolytic solution are inhibited. Thus, deterioration in lifetime performance and high-temperature stability of the lithium battery is reduced, and these characteristics are even improved when the lithium battery is charged with high voltage.

The amount of adiponitrile may be equal to or less than 10 parts by weight based on 100 parts by weight of the total amount of the nonaqueous organic solvent and the lithium salt. For example, the amount of adiponitrile may be about 0.1 parts by weight to about 10 parts by weight based on 100 parts by weight of the total amount of the nonaqueous organic solvent and the lithium salt. If the amount of adiponitrile is within these ranges, lifetime performance and high-temperature stability of the lithium battery including the Ni—Co—Mn-based active material may be substantially improved even though the lithium battery is charged with high voltage (e.g., a voltage equal to or greater than 4.25 V).

In some nonlimiting exemplary embodiments, the amount of adiponitrile may be about 0.1 parts by weight to about 5 parts by weight based on 100 parts by weight of the total amount of the nonaqueous organic solvent and the lithium salt. In other nonlimiting exemplary embodiments, the amount of adiponitrile may be about 1 part by weight to about 5 parts by weight based on 100 parts by weight of the total amount of the nonaqueous organic solvent and the lithium salt. In still other nonlimiting embodiments, the amount of adiponitrile may be 1 part by weight, 2 parts by weight, 5 parts by weight, or 10 parts by weight based on 100 parts by weight of the total amount of the organic solvent and the lithium salt.

The nonaqueous organic solvent contained in the electrolytic solution may function as a medium through which ions participating in electrochemical reactions of the lithium battery pass. The nonaqueous organic solvent may include a carbonate solvent, an ester solvent, an ether solvent, a ketone solvent, an alcohol solvent, or an aprotic solvent.

Nonlimiting examples of suitable carbonate solvents include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

Nonlimiting examples of suitable ester solvents include methyl acetate, ethyl acetate, n-propyl acetate, dimethyl acetate, methyl propionate, ethyl propionate, γ-butyrolactone, decanolide, valerolactone, mevalonolactone, caprolactone, and the like.

Nonlimiting examples of suitable ether solvents include dibutyl ether, tetraglyme, diglyme, dimethoxy ethane, 2-methyltetrahydrofuran, tetrahydrofuran, and the like.

One nonlimiting example of a suitable ketone solvent is cyclohexanone.

Nonlimiting examples of suitable alcohol solvents include ethyl alcohol, isopropyl alcohol, and the like.

Nonlimiting examples of suitable aprotic solvents include nitriles (such as R—CN, where R is a $C_2$-$C_{20}$ linear, branched, or cyclic hydrocarbon-based moiety which may include a double bonded aromatic ring or an ether bond), amides (such as dimethylformamide), dioxolanes (such as 1,3-dioxolane), sulfolanes, and the like.

The nonaqueous organic solvent may include a single solvent used alone or a combination of at least two solvents. If a combination of solvents is used, the ratio of the nonaqueous organic solvents may vary according to the desired performance of the lithium battery. For example, in some nonlimiting embodiments, the nonaqueous organic solvent may be a mixture of ethylene carbonate (EC), ethylmethyl carbonate (EMC) and dimethyl carbonate (DMC) in a volume ratio of 1:1:1.

The lithium salt contained in the electrolytic solution is dissolved in the nonaqueous organic solvent and functions as a source of lithium ions in the lithium battery, which perform the basic operation of the lithium battery and accelerate the migration of lithium ions between the cathode and the anode. The lithium salt may include at least one supporting electrolyte salt selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$, where x and y are natural numbers, LiCl, LiI, $LiB(C_2O_4)_2$, and lithium bis(oxalato) borate (LiBOB).

The concentration of the lithium salt may be about 0.1 M to about 2.0 M. For example, the concentration of the lithium salt may be about 0.6 M to about 2.0 M. If the concentration of the lithium salt is within these ranges, the electrolytic solution may have the desired conductivity and viscosity, and thus lithium ions may efficiently migrate.

The electrolytic solution may further include an additive capable of improving the low temperature performance of the lithium battery and the swelling performance of the lithium battery at high temperature. The additive may be a carbonate material. Nonlimiting examples of suitable carbonate materials include vinylene carbonate (VC); vinylene carbonate (VC) derivatives having at least one substituent selected from halogen atoms (such as —F, —Cl, —Br, and —I), cyano groups (CN), and nitro groups ($NO_2$); and ethylene carbonate (EC) derivatives having at least one substituent selected from halogen atoms (such as —F, —Cl, —Br, and —I), cyano groups (CN), and nitro groups ($NO_2$).

The additive may include a single additive of a combination of at least two additives.

The electrolytic solution may further include an additive selected from vinylene carbonate (VC); fluoroethylene carbonate (FEC), and combinations thereof.

The electrolytic solution may further include fluoroethylene carbonate as an additive.

The electrolytic solution may further include vinylene carbonate and fluoroethylene carbonate as additives.

The amount of the additive may be about 0.1 parts by weight to about 10 parts by weight based on 100 parts by weight of the total amount of the nonaqueous organic solvent and the lithium salt. If the amount of additive is within this range, not only lifetime performance and high-temperature stability of the lithium battery including the Ni—Co—Mn-based active material may be substantially improved, but also low temperature performance of the lithium battery and swelling characteristics of the lithium battery at high temperature may be improved even when the lithium battery is charged with high voltage (e.g., a voltage of about 4.25 V or greater).

In some nonlimiting embodiments, the amount of the additive may be about 1 part by weight to about 5 parts by weight based on 100 parts by weight of the total amount of the nonaqueous organic solvent and the lithium salt. In other nonlimiting embodiments, the amount of the additive may be about 3 parts by weight to about 4 parts by weight based on 100 parts by weight of the nonaqueous organic solvent and the lithium salt.

According to another embodiment of the present invention, a lithium battery includes a cathode containing a nickel (Ni)-cobalt (Co)-manganese (Mn)-based active material, an anode containing an anode active material, and an electrolytic solution. The electrolytic solution includes a nonaqueous organic solvent, a lithium salt, and adiponitrile. The adiponitrile is present in the electrolytic solution in an amount equal to or less than 10 parts by weight based on 100 parts by weight of the total amount of the nonaqueous organic solvent and the lithium salt.

The type of the lithium battery is not limited, and may be, for example, a lithium primary battery or a lithium secondary battery (such as a lithium ion battery, a lithium ion polymer battery, a lithium sulfur battery, or the like).

The cathode may include a current collector and a cathode active material layer formed on the current collector. The cathode may be prepared according to the following process. A cathode active material, a binder, and a solvent are mixed to prepare a cathode active material composition. The solvent may be N-methylpyrrolidone, acetone, water, or the like, but is not limited thereto. Then, the cathode active material composition is directly coated on a current collector (e.g., an aluminum (Al) current collector) and dried to prepare a cathode plate. Alternatively, the cathode active material composition is cast on a separate support to form a film which is then laminated on the current collector to prepare a cathode plate.

The cathode active material for forming the cathode active material layer includes the Ni—Co—Mn-based active material. The Ni—Co—Mn-based active material may be represented by Formula 1, described above. For example, the Ni—Co—Mn-based active material may be $LiNi_{0.5}Co_{0.2}Mn_{0.3}O_2$, but is not limited thereto.

The cathode active material may include a single Ni—Co—Mn-based active material, or may include a Ni—Co—Mn-based active material and at least one second cathode active material.

The second cathode active material may include a lithiated intercalation compound which allows reversible intercalation and deintercalation of lithium. Nonlimiting examples of suitable compounds for the second cathode active material may include compounds represented by the following Formulae 2-26:

$$Li_aA_{1-b}X_bD_2 \quad (2)$$

In Formula (2), $0.95 \le a \le 1.1$, and $0 \le b \le 0.5$.

$$Li_aE_{1-b}X_bO_{2-c}D_c \quad (3)$$

In Formula (3), $0.95 \le a \le 1.1$, $0 \le b \le 0.5$, and $0 \le c \le 0.05$.

$$LiE_{2-b}X_bO_{4-c}D_c \quad (4)$$

In Formula (4), $0 \le b \le 0.5$ and $0 \le c \le 0.05$.

$$Li_aNi_{1-b-c}Co_bB_cD_\alpha \quad (5)$$

In Formula (5), $0.95 \le a \le 1.1$, $0 \le b \le 0.5$, $0 \le c \le 0.05$, and $0 < \alpha \le 2$.

$$Li_aNi_{1-b-c}Co_bX_cO_{2-\alpha}M_\alpha \quad (6)$$

In Formula (6), $0.95 \le a \le 1.1$, $0 \le b \le 0.5$, $0 \le c \le 0.05$, and $0 < \alpha < 2$.

$$Li_aNi_{1-b-c}Co_bX_cO_{2-\alpha}M_2 \quad (7)$$

In Formula (7), $0.95 \le a \le 1.1$, $0 \le b \le 0.5$, $0 \le c \le 0.05$, and $0 < \alpha < 2$.

$$Li_aNi_{1-b-c}Mn_bX_cD_\alpha \quad (8)$$

In Formula (8), $0.95 \le a \le 1.1$, $0 \le b \le 0.5$, $0 \le c \le 0.05$, and $0 < \alpha \le 2$.

$$Li_aNi_{1-b-c}Mn_bX_cO_{2-\alpha}M_\alpha \quad (9)$$

In Formula (9), $0.95 \le a \le 1.1$, $0 \le b \le 0.5$, $0 \le c \le 0.05$, and $0 < \alpha < 2$.

$$Li_aNi_{1-b-c}Mn_bX_cO_{2-\alpha}M_2 \quad (10)$$

In Formula (10), $0.95 \le a \le 1.1$, $0 \le b \le 0.5$, $0 \le c \le 0.05$, and $0 < \alpha < 2$.

$$Li_aNi_bE_cG_dO_2 \quad (11)$$

In Formula (11), $0.90 \le a \le 1.1$, $0 \le b \le 0.9$, $0 \le c \le 0.5$, and $0.001 \le d \le 0.1$.

$$Li_aNi_bCo_cMn_dG_eO_2 \quad (12)$$

In Formula (12), $0.90 \le a \le 1.1$, $0 \le b \le 0.9$, $0 \le c \le 0.5$, $0 \le d \le 0.5$, and $0.001 \le e \le 0.1$.

$$Li_aNiG_bO_2 \quad (13)$$

In Formula (13), $0.90 \le a \le 1.1$ and $0.001 \le b \le 0.1$.

$$Li_aCoG_bO_2 \quad (14)$$

In Formula (14), $0.90 \le a \le 1.1$ and $0.001 \le b \le 0.1$.

$$Li_aMnG_bO_2 \quad (15)$$

In Formula (15), $0.90 \le a \le 1.1$ and $0.001 \le b \le 0.1$.

$$Li_aMn_2G_bO_4 \quad (16)$$

In Formula (16), $0.90 \le a \le 1.1$ and $0.001 \le b \le 0.1$.

$$QO_2 \quad (17)$$

$$QS_2 \quad (18)$$

$$LiQS_2 \quad (19)$$

$$V_2O_5 \quad (20)$$

$$LiV_2O_5 \quad (21)$$

$$LiZO_2 \quad (22)$$

$$LiNiVO_4 \quad (23)$$

$$Li_{(3-f)}J_2(PO_4)_3 \text{ (where } 0 \le f \le 2) \quad (24)$$

$$Li_{(3-f)}Fe_2(PO_4)_3 \text{ (where } 0 \le f \le 2) \quad (25)$$

$$LiFePO_4 \quad (26)$$

In Formulae 2 through 26, A is selected from nickel (Ni), cobalt (Co), manganese (Mn), and combinations thereof. X is selected from aluminum (Al), nickel (Ni), cobalt (Co), manganese (Mn), chromium (Cr), iron (Fe), magnesium (Mg), strontium (Sr), vanadium (V), rare earth elements, and combinations thereof. D is selected from oxygen (O), fluorine (F), sulfur (S), phosphorus (P), and combinations thereof. E is selected from cobalt (Co), manganese (Mn), and combinations thereof. M is selected from fluorine (F), sulfur (S), phosphorus (P), and combinations thereof. G is selected from aluminum (Al), chromium (Cr), manganese (Mn), iron (Fe), magnesium (Mg), lanthanum (La), cerium (Ce), strontium (Sr), vanadium (V), and combinations thereof. Q is selected from titanium (Ti), molybdenum (Mo), manganese (Mn), and combinations thereof. Z is selected from chromium (Cr), vanadium (V), iron (Fe), scandium (Sc), yttrium (Y), and combinations thereof. J is selected from vanadium (V), chromium (Cr), manganese (Mn), cobalt (Co), nickel (Ni), copper (Co), and combinations thereof.

A surface coating layer may be formed on the compounds of Formulae 2 through 26. Alternatively, a mixture of compounds of Formula 2-26 without a coating layer and compounds of Formulae 2-26 having a coating layer may be used. The coating layer may include at least one coating element included compound selected from oxides, hydroxides, oxyhydroxides, oxycarbonates, and hydroxycarbonates of the coating element. The compounds for the coating layer may be amorphous or crystalline. The coating element contained in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof.

The coating layer may be formed using any method (for example, spray coating, dipping, or the like) which does not adversely affect the physical properties of the cathode active material when a compound of the coating element is used.

If the cathode active material is a mixture of the Ni—Co—Mn-based active material and a second cathode active material, the ratio of the Ni—Co—Mn-based active material and the second cathode active material may vary according to the desired performance of the lithium battery.

In one embodiment, the cathode active material contained in the cathode active material layer only includes the Ni—Co—Mn-based active material.

According to another embodiment, the cathode active material contained in the cathode active material layer may include the Ni—Co—Mn-based active material and a second cathode active material. The second cathode active material may be $LiCoO_2$. For example, the Ni—Co—Mn-based active material and the second cathode active material may be mixed in a weight ratio of 3:7, but the ratio is not limited thereto.

The binder contained in the cathode active material layer functions to strongly bind the cathode active material particles to each other and to the current collector. Nonlimiting examples of suitable binders include polyvinyl alcohol, carboxymethyl cellulose, hydroxypropyl cellulose, diacetyl cellulose, polyvinyl chloride, carboxylated polyvinyl chloride, polyvinyl fluoride, and polymers such as ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, nylon, and the like.

The cathode active material layer may further include a conducting agent. The conducting agent is used to provide conductivity to the cathode. Any electrically conductive material may be used so long as it does not cause a chemical change in the battery. Nonlimiting examples of suitable conducting agents include carbonaceous materials (such as natural graphite, artificial graphite, carbon black, acetylene black, ketchen black, carbon fibers, and the like), metal-based materials (such as copper (Cu), nickel (Ni), aluminum (Al), silver (Ag), and the like) in powder or fiber form, conductive materials (including conductive polymers, such as a polyphenylene derivatives), and mixtures thereof.

The current collector may be aluminum (Al), but is not limited thereto.

Similarly, an anode active material, a conducting agent, a binder and a solvent are mixed to prepare an anode active material slurry. The anode active material composition is directly coated on a current collector (e.g., a Cu current collector), or is cast on a separate support to form a film which is then laminated on a Cu current collector to obtain an anode plate. The amounts of the anode active material, the conducting agent, the binder and the solvent are those commonly used in lithium batteries.

Nonlimiting examples of suitable anode active materials include natural graphite, silicon/carbon complexes ($SiO_x$), silicon metal, silicon thin films, lithium metal, lithium alloys, carbonaceous materials and graphite. The conducting agent, the binder and the solvent in the anode active material composition may be the same as those in the cathode active material composition. If desired, a plasticizer may be added to the cathode active material composition and the anode active material composition to produce pores inside the electrode plates.

A separator may be positioned between the cathode and the anode according to the type of lithium battery. Any separator commonly used for lithium batteries may be used. In one embodiment, the separator may have low resistance to the migration of ions in an electrolyte and a high electrolyte-retaining ability. Nonlimiting examples of materials used to form the separator include glass fiber, polyester, Teflon, polyethylene, polypropylene, polytetrafluoroethylene (PTFE), and combinations thereof, each of which may be a nonwoven or woven fabric. In one embodiment, a windable separator formed of a material such as polyethylene and/or polypropylene may be used for lithium ion batteries. In another embodiment, a separator capable of retaining a large amount of organic electrolytic solution may be used for lithium ion polymer batteries. These separators may be prepared according to the following process.

A polymer resin, a filler, and a solvent are mixed to prepare a separator composition. Then, the separator composition may be directly coated on an electrode, and then dried to form a separator film. Alternatively, the separator composition may be cast on a separate support and then dried to form a separator composition film which is then removed from the support and laminated on an electrode to form a separator film.

The polymer resin may be any material that may be used as a binder for an electrode plate. Nonlimiting examples of suitable polymer resins include vinylidenefluoride/hexafluoropropylene copolymers, polyvinylidenefluoride, polyacrylonitrile, polymethylmethacrylate and mixtures thereof. For example, a vinylidenefluoride/hexafluoropropylene copolymer having about 8 to about 25 wt % of hexafluoropropylene may be used.

The separator may be positioned between the cathode plate and the anode plate to form a battery assembly. The battery assembly is wound or folded and then sealed in a cylindrical or rectangular battery case. Then, an organic electrolytic solution is injected into the battery case to complete the manufacture of a lithium ion battery. Alternatively, a plurality of electrode assemblies may be stacked in a bi-cell structure and impregnated with an organic electrolytic solution. The resultant structure is placed into a pouch and sealed, thereby completing the manufacture of a lithium ion polymer battery.

Figure 1:
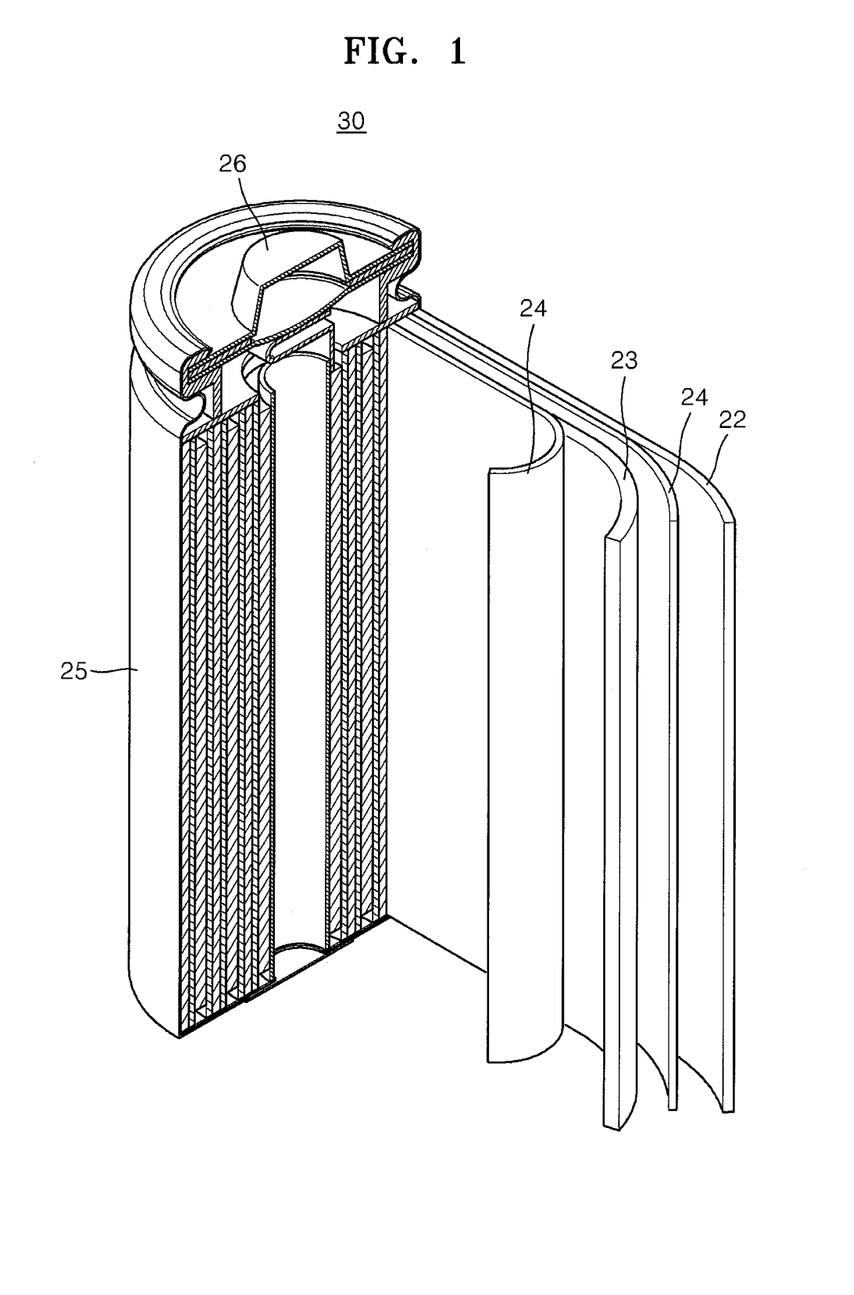
FIG. 1 is a schematic perspective view of a lithium battery according to an embodiment of the present invention.

FIG. 1 is a schematic perspective view of a lithium battery according to an embodiment of the present invention. Referring to FIG. 1, a lithium battery 30 according to some embodiments includes an electrode assembly having a cathode 23, an anode 22 and a separator 24 between the cathode 23 and the anode 22. The electrode assembly is contained within a battery case 25, and a sealing member 26 seals the case 25. An electrolyte (not shown) is injected into the battery case to impregnate the electrode assembly. The lithium battery 30 is manufactured by sequentially stacking the cathode 23, the anode 22 and the separator 24 on one another, winding the stack in a spiral form, and inserting the wound stack into the battery case 25.

The existence and amount of a target element (e.g., adiponitrile) contained in the electrolytic solution of the lithium battery to be analyzed may be measured by gas chromatography (GC). Quantitative analysis of the target element may be performed using an internal standard method (ISTD) or an external standard method (ESTD).

According to the ISTD, the quantitative analysis may be performed using ethyl acetate (EA) as an internal standard. According to the ESTD, the quantitative analysis may be performed using at least two standards per concentration for the target element (e.g., adiponitrile) to be analyzed.

A nonlimiting example of a method for quantitatively analyzing the target element (e.g., adiponitrile) contained in the electrolytic solution of the lithium battery may include extracting the electrolytic solution from the lithium battery, performing GC on the extracted electrolytic solution using ISTD and/or ESTD and collecting data of the target element, and calculating the amount (% by weight or % by volume) of the target element from the data.

Details of GC are disclosed in Skoog, et al., "Principles of Instrumental Analysis," Fifth edition, pp. 701-722, the entire content of which is incorporated herein by reference.

Since the lithium battery according to embodiments of the present invention includes a Ni—Co—Mn-based active material, and the electrolytic solution contains adiponitrile, the lifetime and high-temperature stability characteristics of the battery may be improved even when the lithium battery is charged with a high voltage (e.g. about 4.25 V or greater). The lifetime and high-temperature stability characteristics may also be improved when the lithium battery is charged with a voltage of about 4.3 V or greater. The lifetime and high-temperature stability characteristics may also be improved when the lithium battery is charged with a voltage of about 4.4 V or greater. Thus, the lithium battery may have high capacity, long lifetime, and good high-temperature stability.

The final charge voltage of the lithium battery may be equal to or greater than 4.25 V. In one embodiment, for example, the final charge voltage of the lithium battery may be equal to or greater than 4.3 V. In another exemplary embodiment, the final charge voltage of the lithium battery may be equal to or greater than 4.4 V.

According to another embodiment of the present invention, a method of operating a lithium battery includes providing the lithium battery described above, and charging the lithium battery to a final charge voltage equal to or greater than 4.25 V.

According to the method of operating the lithium battery, the lithium battery may have long lifetime and good high-temperature stability characteristics even though the lithium battery is charged to a final charge voltage of about 4.25 V or greater. Thus, a lithium battery having high capacity may be operated by charging it to a high voltage of about 4.25 V or greater.

The following Examples are presented for illustrative purposes only and do not limit the scope of the present invention.

EXAMPLES

Example 1

Natural graphite and a polyvinylidene fluoride (PVDF) binder were mixed in a weight ratio of 96:4 in an N-methylpyrrolidone solvent to prepare an anode slurry. The anode slurry was coated on a copper (Cu)-foil to a thickness of 14 μm to prepare a thin plate, dried at 135° C. for 3 hours or more, and pressed to prepare an anode.

$LiNi_{0.5}Co_{0.2}Mn_{0.3}O_2$ as a cathode active material, PVDF as a binder, and a carbon conductor as a conducting agent in a weight ratio of 96:2:2 were dispersed in N-methylpyrrolidone as a solvent to prepare cathode slurry. The cathode slurry was coated on a thin Al film to a thickness of 60 μm to prepare a thin plate, dried at 135° C. for 3 hours or more, and pressed to prepare a cathode.

Fluoroethylene carbonate (FEC), adiponitrile and 1.3 M $LiPF_6$ were added to a mixed solvent containing ethylene carbonate (EC), ethylmethyl carbonate (EMC), and dimethyl carbonate (DMC) in a volume ratio of 1:1:1 to prepare an electrolytic solution. Here, the amount of fluoroethylene carbonate was 3 parts by weight based on 100 parts by weight of the total amount of the solvent and the $LiPF_6$, and the amount of adiponitrile was 1 part by weight based on 100 parts by weight of the total amount of the solvent and the $LiPF_6$.

The anode and the cathode were wound using a porous polyethylene (PE) film as a separator, and pressed into a battery case. Then, the electrolytic solution was injected into the battery case to prepare a lithium battery having a capacity of 2600 mAh.

Example 2

A lithium battery was prepared as in Example 1, except that the amount of adiponitrile was 2 parts by weight based on 100 parts by weight of the total amount of the solvent and the $LiPF_6$.

Comparative Example 1

A lithium battery was prepared as in Example 1, except that adiponitrile was not used.

Comparative Example 2

A lithium battery was prepared as in Example 1, except that succinonitrile was used instead of adiponitrile, and the amount of succinonitrile was 2 parts by weight based on 100 parts by weight of the total amount of the solvent and the $LiPF_6$.

Evaluation Example 1

Evaluation of Lifetime and High-Temperature Stability

The lithium batteries prepared according to Examples 1 and 2 and Comparative Examples 1 and 2 were charged with 520 mA and 4.3 V, in a Constant Current (CC)/Constant Voltage (CV) mode at room temperature. When the batteries had a current amount of 20 mA, they were discharged to 2.75 V at 520 mA in a CC mode. The lithium batteries were subjected to a formation process by repeating the charging and discharging cycles 3 times.
Evaluation of Lifetime The lithium batteries according to Examples 1 and 2 and Comparative Examples 1 and 2 subjected to the formation process were charged with 2080 mA and 4.3 V, in a CC/CV mode. When the batteries had a current amount of 100 mA, they were discharged to 3 V at 2600 mA in a CC mode at room temperature (about 25° C.). Then, initial capacity thereof was measured. After 100 charge and discharge cycles were performed for each of the lithium batteries, capacity was measured. Based thereon, the capacity retention ((capacity after 100 cycles/initial capacity)×100)(%) was calculated to evaluate lifetime characteristics at room temperature after 100 cycles.

Lifetime characteristics of the lithium batteries at 45° C. after 300 cycles were evaluated in the same manner as described above performed at room temperature, except that the temperature was changed from room temperature to 45° C. and the number of cycles was changed from 100 to 300.

Figure 2:
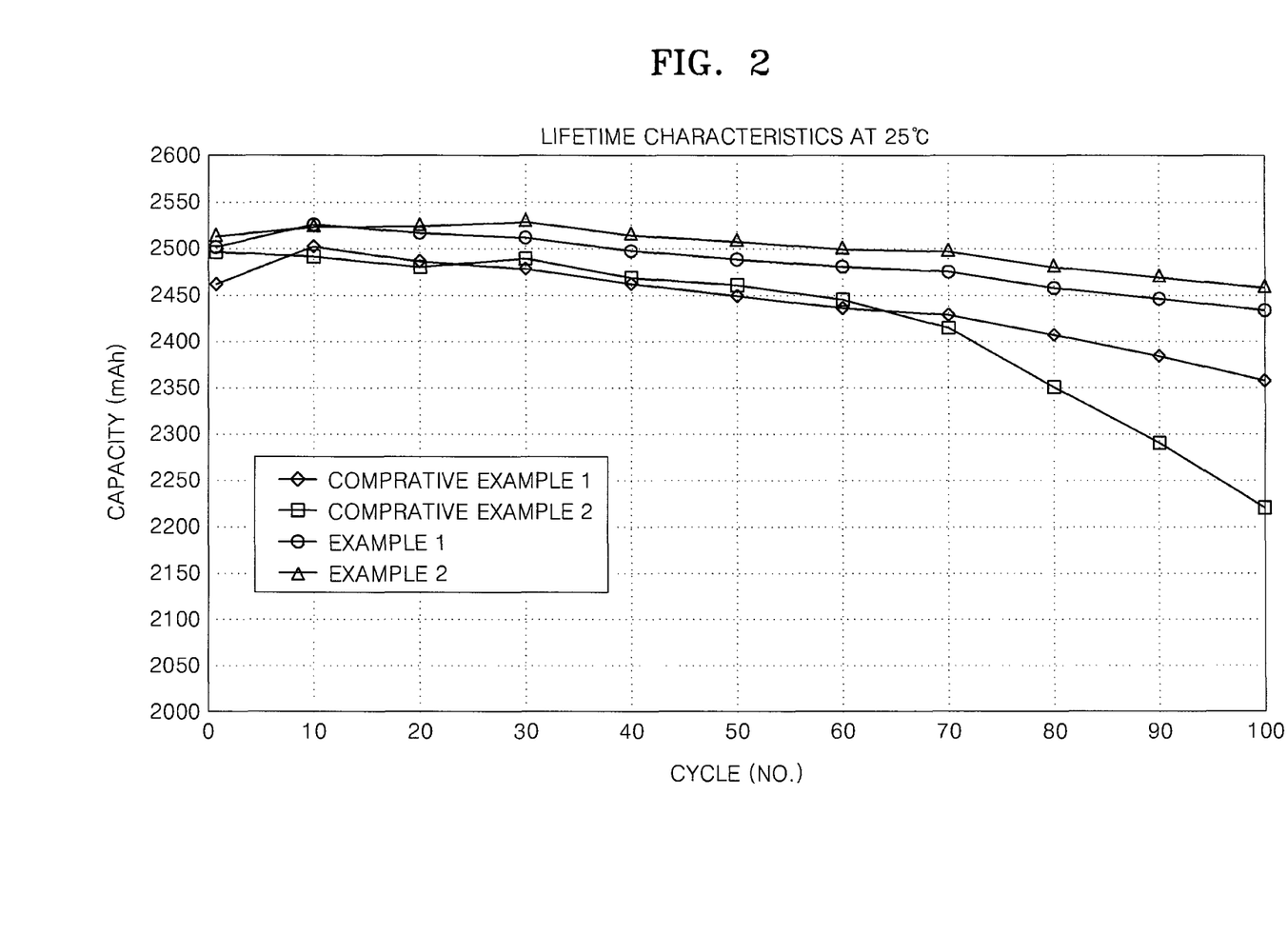
FIG. 2 is a graph comparing lifetime performance of lithium batteries prepared according to Comparative Examples 1 and 2 and Examples 1 and 2.

The results of this evaluation of lifetime are shown in Table 1 below. Lifetime characteristics at room temperature after 100 cycles are shown in FIG. 2.
Evaluation of High-Temperature Stability The lithium batteries according to Examples 1 and 2 and Comparative Examples 1 and 2 subjected to the formation process were charged with 1300 mA and 4.3 V in a CC/CV mode at room temperature (about 25° C.). When the batteries had a current amount of 100 mA, they were discharged to 2.75 V at 520 mA in a CC mode. Then, initial capacity thereof was measured. Then, each of the lithium batteries was charged with 1300 mA and 4.3 V in a CC/CV mode. When the cells had a current amount of 100 mA, they were left at 60° C. for 30 days, and then discharged to 2.75 V at 520 mA to measure open circuit voltage (OCV) and capacity after standing at 60° C. for 30 days at 1000 khz. Accordingly, capacity retention after standing at 60° C. for 30 days ((capacity after being left at 60° C. for 30 days/initial capacity)×100)(%) was calculated.

The results of this evaluation of high-temperature stability are shown in Table 1 below.

TABLE 1

|  | Additive | Adiponitrile | Room temperature-lifetime (100 cycle) (%) | 45° C.-lifetime (300 cycle) (%) | 60° C.-OCV after 30 days (mV) | 60° C.-capacity retention after 30 days (%) |
|---|---|---|---|---|---|---|
| Comparative Example 1 | FEC (3 parts by weight) | — | 95.7 | — | 4022 | 74.0 |
| Comparative Example 2 | FEC (3 parts by weight) | succinonitrile (2 parts by weight) | 89.0 | — | 4153 | 88.3 |
| Example 1 | FEC (3 parts by weight) | adiponitrile (1 part by weight) | 97.3 | 88.8 | 4154 | 88.8 |
| Example 2 | FEC (3 parts by weight) | adiponitrile (2 parts by weight) | 97.8 | 88.5 | 4154 | 89.2 |

Referring to Table 1 and FIG. 2, the lithium batteries prepared according to Examples 1 and 2 showed better lifetime performance and high-temperature stability when charged with a high voltage of 4.3V than the lithium batteries prepared according to Comparative Examples 1 and 2. Also, the lithium battery prepared according to Example 2 (with 2 parts by weight adiponitrile) exhibited surprisingly better lifetime performance and high-temperature stability compared to Comparative Example 2 (with 2 parts by weight succinonitrile).

Comparative Example 3

A lithium battery was prepared as in Comparative Example 1, except that 2 parts by weight of vinylene carbonate (VC) based on 100 parts by weight of the total amount of the solvent and the lithium salt, and 2 parts by weight of FEC based on 100 parts by weight of the total amount of the solvent and the lithium salt were used as additives instead of 3 parts by weight of FEC.

Comparative Example 4

A lithium battery was prepared as in Comparative Example 2, except that 2 parts by weight of VC based on 100 parts by weight of the total amount of the solvent and the lithium salt, and 2 parts by weight of FEC based on 100 parts by weight of the total amount of the solvent and the lithium salt were used as additives instead of 3 parts by weight of FEC.

Example 3

A lithium battery was prepared as in Example 1, except that 2 parts by weight of VC based on 100 parts by weight of the total amount of the solvent and the lithium salt, and 2 parts by weight of FEC based on 100 parts by weight of the total amount of the solvent and the lithium salt were used as additives instead of 3 parts by weight of FEC.

Example 4

A lithium battery was prepared as in Example 2, except that 2 parts by weight of VC based on 100 parts by weight of the total amount of the solvent and the lithium salt, and 2 parts by weight of FEC based on 100 parts by weight of the total amount of the solvent and the lithium salt were used as additives instead of 3 parts by weight of FEC.

Example 5

A lithium battery was prepared as in Example 4, except that 5 parts by weight of adiponitrile based on 100 parts by weight of the total amount of the solvent and the lithium salt was used instead of 2 parts by weight of adiponitrile.

Example 6

A lithium battery was prepared as in Example 4, except that 10 parts by weight of adiponitrile based on 100 parts by weight of the total amount of the solvent and the lithium salt was used instead of 2 parts by weight of adiponitrile.

Comparative Example 5

A lithium battery was prepared in the same manner as in Example 4, except that 15 parts by weight of adiponitrile based on 100 parts by weight of the solvent and the lithium salt was used instead of 2 parts by weight of adiponitrile.

Evaluation Example 2

Evaluation of Lifetime

Lifetime performance of the lithium batteries prepared according to Comparative Examples 3 to 5 and Examples 3 to 6 were evaluated at 45° C. after 300 cycles using the same procedure as in Evaluation Example 1. The results are shown in Table 2 and FIG. 3.

TABLE 2

| | Additive | Adiponitrile | 45° C.-lifetime (300 cycles) (%) |
|---|---|---|---|
| Comparative Example 3 | VC (2 parts by weight) FEC (2 parts by weight) | — | — |
| Comparative Example 4 | VC (2 parts by weight) FEC (2 parts by weight) | succinonitrile (2 parts by weight) | — |
| Example 3 | VC (2 parts by weight) FEC (2 parts by weight) | adiponitrile (1 part by weight) | 88.8 |
| Example 4 | VC (2 parts by weight) FEC (2 parts by weight) | adiponitrile (2 parts by weight) | 88.5 |
| Example 5 | VC (2 parts by weight) FEC (2 parts by weight) | adiponitrile (5 parts by weight) | 86.7 |
| Example 6 | VC (2 parts by weight) FEC (2 parts by weight) | adiponitrile (10 parts by weight) | 82.2 |
| Comparative Example 5 | VC (2 parts by weight) FEC (2 parts by weight) | adiponitrile (15 parts by weight) | 3.6 |

Figure 3:
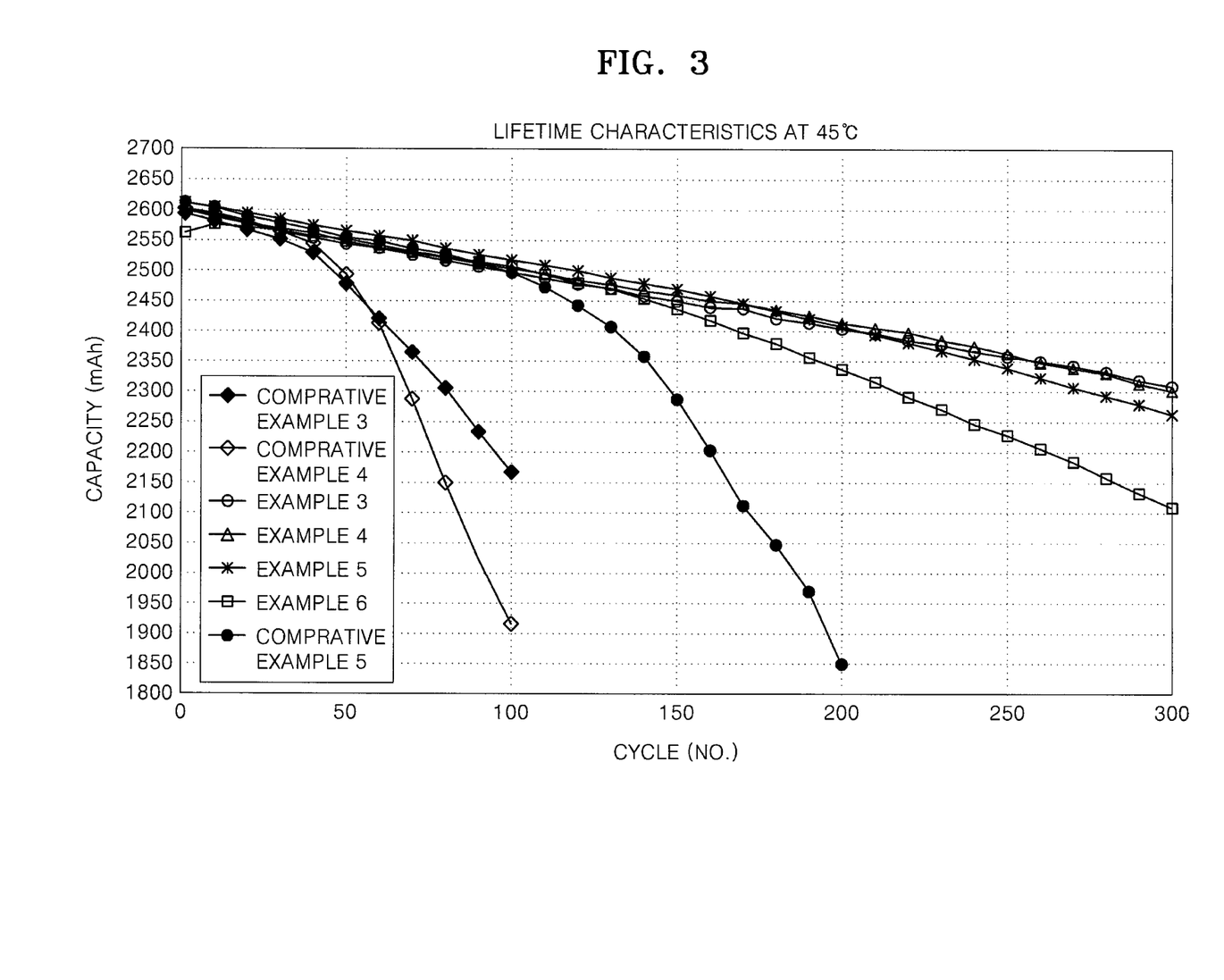
FIG. 3 is a graph comparing lifetime performance of lithium batteries prepared according to Comparative Examples 3 to 5 and Examples 3 to 6.

Referring to Table 2 and FIG. 3, the lithium batteries prepared according to Examples 3 to 6 showed better high-temperature stability when charged with a high voltage of 4.3V than lithium batteries prepared according to Comparative Examples 3 to 5. Also, the lithium battery prepared according to Example 4 (with 2 parts by weight adiponitrile) exhibited surprisingly better results than the battery prepared according to Comparative Example 4 (with 2 parts by weight succinonitrile). Additionally, the batteries prepared according to Examples 3, 4, 5 and 6 (with 1, 2, 5 and 10 parts by weight adiponitrile respectively) exhibited surprisingly better results than the battery prepared according to Comparative Example 5 (with 15 parts by weight adiponitrile).

Comparative Example 6

A lithium battery was prepared as in Comparative Example 3, except that a mixture of $LiCoO_2$ and $LiNi_{0.5}Co_{0.2}Mn_{0.3}O_2$ (in a weight ratio of 7:3) was used instead of only using $LiNi_{0.5}Co_{0.2}Mn_{0.3}O_2$ as the cathode active material.

Comparative Example 7

A lithium battery was prepared as in Comparative Example 4, except that a mixture of $LiCoO_2$ and $LiNi_{0.5}Co_{0.2}Mn_{0.3}O_2$ (in a weight ratio of 7:3) was used instead of only using $LiNi_{0.5}Co_{0.2}Mn_{0.3}O_2$ as the cathode active material.

Example 7

A lithium battery was prepared as in Example 3, except that a mixture of $LiCoO_2$ and $LiNi_{0.5}Co_{0.2}Mn_{0.3}O_2$ (in a weight ratio of 7:3) was used instead of only using $LiNi_{0.5}Co_{0.2}Mn_{0.3}O_2$ as the cathode active material.

Example 8

A lithium battery was prepared as in Example 4, except that a mixture of $LiCoO_2$ and $LiNi_{0.5}Co_{0.2}Mn_{0.3}O_2$ (in a weight ratio of 7:3) was used instead of only using $LiNi_{0.5}Co_{0.2}Mn_{0.3}O_2$ as the cathode active material.

Example 9

A lithium battery was prepared as in Example 5, except that a mixture of $LiCoO_2$ and $LiNi_{0.5}Co_{0.2}Mn_{0.3}O_2$ (in a weight ratio of 7:3) was used instead of only using $LiNi_{0.5}Co_{0.2}Mn_{0.3}O_2$ as the cathode active material.

Evaluation Example 3

Lifetime performance of the lithium batteries prepared according to Comparative Examples 6 and 7 and Examples 7 to 9 was evaluated as in Evaluation Example 1, except that 200 charge and discharge cycles were conducted at 45° C. instead of 300 cycles. The results are shown in Table 3 and FIG. 4.

TABLE 3

| | Additive | Adiponitrile | 45° C.-lifetime (200 cycle) (%) |
|---|---|---|---|
| Comparative Example 6 | VC (2 parts by weight) FEC (2 parts by weight) | — | 81.9 |
| Comparative Example 7 | VC (2 parts by weight) FEC (2 parts by weight) | succinonitrile (2 parts by weight) | 82.8 |
| Example 7 | VC (2 parts by weight) FEC (2 parts by weight) | adiponitrile (1 part by weight) | 92.8 |
| Example 8 | VC (2 parts by weight) FEC (2 parts by weight) | adiponitrile (2 parts by weight) | 93.9 |
| Example 9 | VC (2 parts by weight) FEC (2 parts by weight) | adiponitrile (5 parts by weight) | 92.3 |

Figure 4:
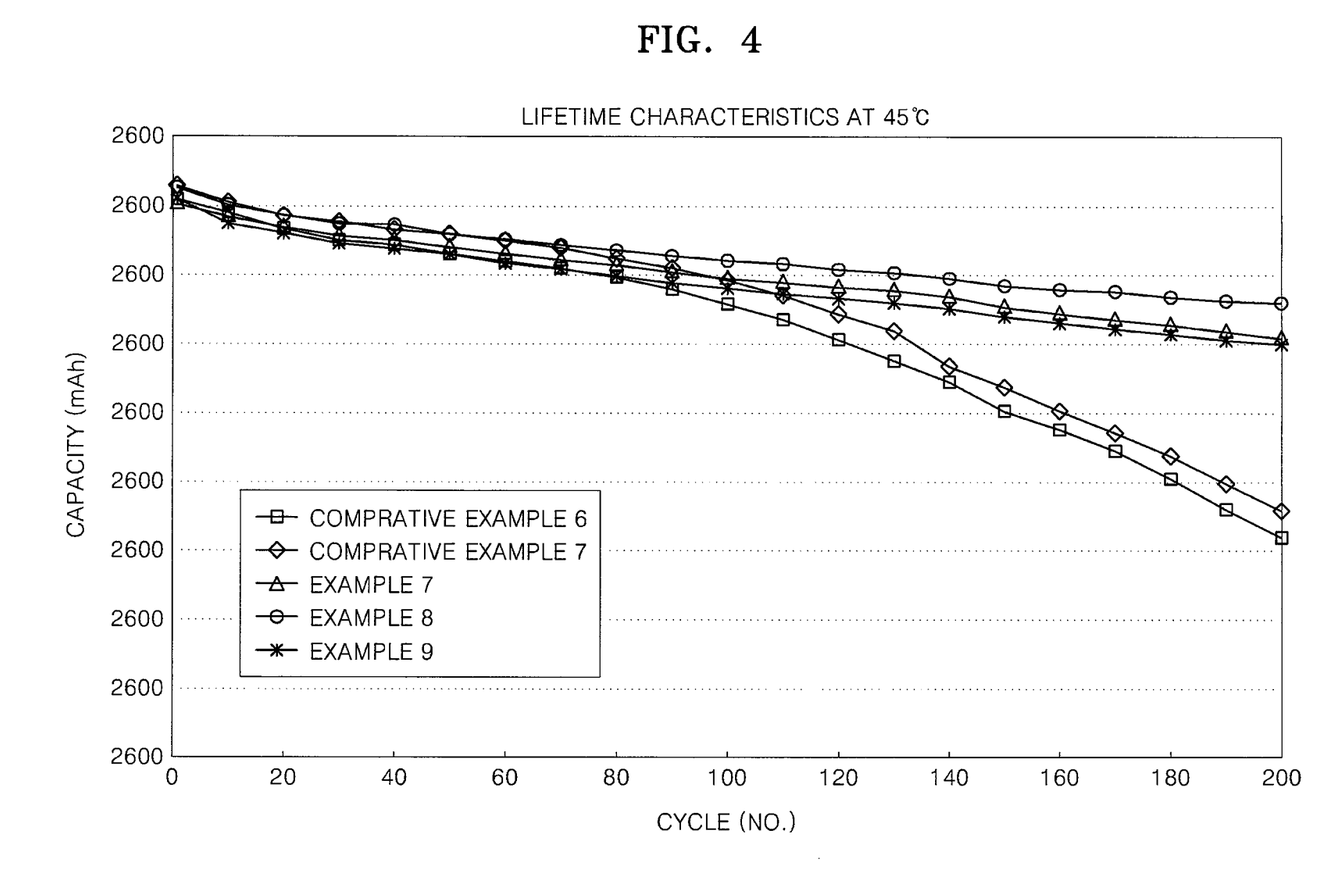
FIG. 4 is a graph comparing lifetime performance of lithium batteries according to Comparative Examples 6 and 7 and Examples 7 to 9.

Referring to Table 3 and FIG. 4, the lithium batteries prepared according to Examples 7 to 9 showed better high-temperature stability when charged with a high voltage of 4.3V than lithium batteries prepared according to Comparative Examples 6 and 7. Also, the lithium battery prepared according to Example 9 (with 2 parts by weight adiponitrile) exhibited surprisingly better results than the battery prepared according to Comparative Example 7 (with 2 parts by weight succinonitrile).

Comparative Example 8

A lithium battery was prepared as in Comparative Example 3, except that $LiCoO_2$ was used instead of using $LiNi_{0.5}Co_{0.2}Mn_{0.3}O_2$ as the cathode active material.

Comparative Example 9

A lithium battery was prepared as in Example 4, except that $LiCoO_2$ was used instead of using $LiNi_{0.5}Co_{0.2}Mn_{0.3}O_2$ as the cathode active material.

Evaluation Example 4

Evaluation of Current Interrupt Device (CID) Operation Time

Lithium batteries prepared according to Comparative Examples 8, 9, and 3 and Examples 4 and 5 were charged with 520 mA and 4.3 V in a CC/CV mode at room temperature. When the cells reached a current amount of 20 mA, they were discharged to 2.75 V at 520 mA in a CC mode. The batteries were subjected to a formation process by repeating the charging and discharging 3 times.

The lithium batteries according to Comparative Examples 8, 9, and 3 and Examples 4 and 5 subjected to the formation process were charged with 1300 mA and 4.4 V in a CC/CV mode at room temperature. When the batteries reached a current amount of 100 mA, they were left to stand at 90° C. Then, current interrupt device (CID) operation time was measured. The CID is a device that senses changes in pressure (e.g., increases in pressure) in a sealed device and blocks current when the pressure rises above a desired level.

TABLE 4

| | Cathode active material | Additive | Adiponitrile | CID operation time |
|---|---|---|---|---|
| Comparative Example 8 | $LiCoO_2$ | VC (2 parts by weight) FEC (2 parts by weight) | — | After 1 hour |
| Comparative Example 9 | $LiCoO_2$ | VC (2 parts by weight) FEC (2 parts by weight) | adiponitrile (2 parts by weight) | After 2 hour |
| Comparative Example 3 | $LiNi_{0.5}Co_{0.2}Mn_{0.3}O_2$ | VC (2 parts by weight) FEC (2 parts by weight) | — | After 12 hour |
| Example 4 | $LiNi_{0.5}Co_{0.2}Mn_{0.3}O_2$ | VC (2 parts by weight) FEC (2 parts by weight) | adiponitrile (2 parts by weight) | After 26 hour |
| Example 5 | $LiNi_{0.5}Co_{0.2}Mn_{0.3}O_2$ | VC (2 parts by weight) FEC (2 parts by weight) | adiponitrile (5 parts by weight) | After 30 hour |

Referring to Table 4, the lithium batteries prepared according to Examples 4 and 5 showed longer CID operation times when charged with a high voltage of 4.4V and left at 90° C. than the lithium batteries prepared according to Comparative Examples 8, 9 and 3. According to the results shown in Table 4, it was identified that gas generation caused by side reactions between the cathode and the electrolytic solution is substantially inhibited at 90° C. in the lithium batteries prepared according to Examples 4 and 5 as compared to the lithium batteries prepared according to Comparative Examples 8, 9 and 3. Also, the lithium battery prepared according to Example 4 (with a $LiNi_{0.5}Co_{0.2}Mn_{0.3}O_2$ active material, and 2 parts by weight adiponitrile) exhibited a surprisingly better CID operation time than the battery prepared according to Comparative Example 9 (with a $LiCoO_2$, and 2 parts by weight adiponitrile).

Comparative Example 10

A lithium battery was prepared as in Comparative Example 2, except that $LiCoO_2$ was used instead of using $LiNi_{0.5}Co_{0.2}Mn_{0.3}O_2$ as the cathode active material.

Comparative Example 11

A lithium battery was prepared as in Example 2, except that glutaronitrile was used instead of succinonitrile.

Comparative Example 12

A lithium battery was prepared as in Comparative Example 10, except that glutaronitrile was used instead of succinonitrile.

Evaluation Example 5

Evaluation of Current Interrupt Device (CID) Operation Time

CID operation time of the lithium batteries prepared according to Comparative Examples 2, 10, 11 and 12, and Example 2 was evaluated as in Evaluation Example 4. The results are shown in Table 5 below along with the previously reported results for Comparative Example 9.

TABLE 5

| | Cathode active material | Additive | Adiponitrile | CID operation time |
|---|---|---|---|---|
| Comparative Example 2 | $LiNi_{0.5}Co_{0.2}Mn_{0.3}O_2$ | FEC (3 parts by weight) | succinonitrile (2 parts by weight) | After 10 hour |
| Comparative Example 10 | $LiCoO_2$ | FEC (3 parts by weight) | succinonitrile (2 parts by weight) | After 2 hour |
| Example 2 | $LiNi_{0.5}Co_{0.2}Mn_{0.3}O_2$ | FEC (3 parts by weight) | adiponitrile (2 parts by weight) | After 28 hour |
| Comparative Example 9 | $LiCoO_2$ | VC (2 parts by weight) FEC (2 parts by weight) | adiponitrile (2 parts by weight) | After 2 hour |
| Comparative Example 11 | $LiNi_{0.5}Co_{0.2}Mn_{0.3}O_2$ | FEC (3 parts by weight) | glutaronitrile (2 parts by weight) | After 12 hour |
| Comparative Example 12 | $LiCoO_2$ | FEC (3 parts by weight) | glutaronitrile (5 parts by weight) | After 2 hour |

Referring to Table 5, the CID operated after 10 hours for the battery prepared according to Comparative Example 2 (with succinonitrile), and the CID operated after 2 hours for the battery prepared according to Comparative Example 10 (with succinonitrile), showing only a slight improvement when succinonitrile is used in combination with a $LiNi_{0.5}Co_{0.2}Mn_{0.3}O_2$ cathode active material as opposed to a $LiCoO_2$ active material. Similarly, the CID operated after 12 hours for the battery prepared according to Comparative Example 11 (with glutaronitrile), and the CID operated after 2 hours for the battery prepared according to Comparative Example 12 (with glutaronitrile), showing only a slight improvement when glutaronitrile is used in combination with a $LiNi_{0.5}Co_{0.2}Mn_{0.3}O_2$ cathode active material as opposed to a $LiCoO_2$ active material.

In contrast, the CID operated after 2 hours for the battery prepared according to Comparative Example 9 (with adiponitrile), and the CID operated after 28 hours for the battery prepared according to Example 2 (adiponitrile), showing a significant and surprising improvement when adiponitrile is used in combination with a $LiNi_{0.5}Co_{0.2}Mn_{0.3}O_2$ cathode active material as opposed to a $LiCoO_2$ active material.

Also referring to Table 5, the CID operated after 12 hours for the battery prepared according to Comparative Example 11 (with glutaronitrile), and the CID operated after 10 hours for the battery prepared according to Comparative Example 2 (with succinonitrile), showing that succinonitrile and glutaronitrile perform similarly when used in combination with a $LiNi_{0.5}Co_{0.2}Mn_{0.3}O_2$ cathode active material. The CID operated after 2 hours for the battery prepared according to Comparative Example 10 (with succinonitrile), and the CID operated after 2 hours for the battery prepared according to Comparative Example 12 (with glutaronitrile), showing that succinonitrile and glutaronitrile also perform similarly when used in combination with a $LiCoO_2$ active material. Also, Table 5 shows only a slight difference in CID operation time between batteries including a $LiNi_{0.5}Co_{0.2}Mn_{0.3}O_2$ cathode active material in combination with either succinonitrile or glutaronitrile and batteries including a $LiCoO_2$ cathode active material in combination with either succinonitrile or glutaronitrile. In contrast, Table 5 shows a significant and surprising difference in CID operation time between batteries including a $LiNi_{0.5}Co_{0.2}Mn_{0.3}O_2$ cathode active material in combination with adiponitrile and batteries including a $LiCoO_2$ cathode active material in combination with adiponitrile.

Additionally, the CID operated after 12 hours for the battery prepared according to Comparative Example 11 (with glutaronitrile), and the CID operated after 10 hours for the battery prepared according to Comparative Example 2 (with succinonitrile). However, the CID operated after 28 hours for the battery prepared according to Example 2 (with adiponitrile), showing a remarkable and surprising improvement over the batteries using succinonitrile and glutaronitrile.

As described above, according to embodiments of the present invention, lithium batteries containing a cathode with a Ni—Co—Mn-based active material that employ the electrolytic solution have significantly improved lifetime and high-temperature stability characteristics even when charged with a high voltage.

While the present invention has been described in connection with certain exemplary embodiments, it is understood by those of ordinary skill in the art that certain modifications may be made to the described embodiments without departing from the spirit and scope of the present invention, as defined by the appended claims.

What is claimed is:

1. A lithium battery, comprising:
   a negative electrode comprising a negative active material;
   a positive electrode comprising a first positive active material comprising a material represented by Formula 1, and a second positive active material comprising $LiCoO_2$:

$$Li_x(Ni_pCo_qMn_r)O_y \quad \text{Formula 1}$$

wherein $0.97 \leq x \leq 1.03$, p is 0.5, q is 0.2, r is 0.3, and y is 2; and
   an electrolytic solution comprising:
      a nonaqueous organic solvent;
      a lithium salt;
      a carbonate-based additive selected from the group consisting of vinylene carbonate, fluoroethylene carbonate, and combinations thereof; and
      adiponitrile in an amount of about 1 to about 10 parts by weight based on 100 parts by weight of the total amount of the nonaqueous organic solvent and the lithium salt.

2. The lithium battery according to claim 1, wherein the adiponitrile is present in the electrolytic solution in an amount of about 1 to about 5 parts by weight based on 100 parts by weight of the total amount of the nonaqueous organic solvent and the lithium salt.

3. The lithium battery according to claim 1, wherein the first positive active material comprises $LiNi_{0.5}Co_{0.2}Mn_{0.3}O_2$.

4. The lithium battery according to claim 1, wherein the carbonate-based additive is present in the electrolytic solution in an amount of about 0.1 to about 10 parts by weight based on 100 parts by weight of the total amount of the nonaqueous organic solvent and the lithium salt.

5. The lithium battery according to claim 1, further comprising a final charge voltage of about 4.25V or greater.

6. A method of charging a lithium battery, comprising:
   providing the lithium battery of claim 1; and
   charging the lithium battery to a final charge voltage of about 4.25 V or greater.

* * * * *